United States Patent
Gmirya et al.

(10) Patent No.: US 10,494,089 B2
(45) Date of Patent: Dec. 3, 2019

(54) DRIVE SHAFT SYSTEM HANGER BEARING

(71) Applicant: Sikorsky Aircraft Corporation, Stratford, CT (US)

(72) Inventors: Yuriy Gmirya, Woodbridge, CT (US); Rodger W. Bowman, Derby, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 374 days.

(21) Appl. No.: 15/312,769

(22) PCT Filed: Mar. 23, 2015

(86) PCT No.: PCT/US2015/021990
§ 371 (c)(1),
(2) Date: Nov. 21, 2016

(87) PCT Pub. No.: WO2015/195174
PCT Pub. Date: Dec. 23, 2015

(65) Prior Publication Data
US 2017/0203837 A1 Jul. 20, 2017

Related U.S. Application Data

(60) Provisional application No. 62/001,234, filed on May 21, 2014.

(51) Int. Cl.
*B64C 27/12* (2006.01)
*B64C 27/14* (2006.01)
(Continued)

(52) U.S. Cl.
CPC ............. *B64C 27/12* (2013.01); *B64C 27/06* (2013.01); *B64C 27/14* (2013.01); *B64C 27/82* (2013.01);
(Continued)

(58) Field of Classification Search
CPC ......... B64C 27/12; B64C 27/14; B64C 27/82; F16C 23/082; F16C 23/086; F16C 23/088; F16C 35/063
See application file for complete search history.

(56) References Cited

U.S. PATENT DOCUMENTS 1,280,664 A * 10/1918 Clark .................... F16C 23/086
384/560
1,356,848 A 10/1920 Bokelund
(Continued)

OTHER PUBLICATIONS

ISR/WO, Issued Dec. 22, 2015, PCT Application No. PCT/US15/21990, 10 pages.

*Primary Examiner* — Philip J Bonzell
(74) *Attorney, Agent, or Firm* — Cantor Colburn LLP

(57) ABSTRACT

A hanger bearing assembly for a shaft assembly includes a plurality of bearing elements arranged around a circumference of a shaft assembly, each bearing element having a bearing element diameter. A bearing inner race is positioned between the plurality of bearing elements and the shaft assembly and extends circumferentially about the shaft assembly. The bearing inner race includes an outer wall interactive with the plurality of bearing elements. The outer wall has a linear profile extending in an axial direction. A bearing outer race is positioned radially outboard of the plurality of bearing elements and extends circumferentially about the shaft assembly. The bearing outer race includes an inner surface interactive with the plurality of bearing elements and having a curvilinear inner surface profile extending in the axial direction.

13 Claims, 4 Drawing Sheets

(51) Int. Cl.
  *B64C 27/82* (2006.01)
  *B64C 27/06* (2006.01)
  *F16C 27/06* (2006.01)
  *F16C 19/06* (2006.01)
  *F16C 23/08* (2006.01)

(52) U.S. Cl.
  CPC .............. *F16C 19/06* (2013.01); *F16C 23/08* (2013.01); *F16C 23/086* (2013.01); *F16C 27/066* (2013.01)

(56) References Cited

U.S. PATENT DOCUMENTS

| | | | | |
|---|---|---|---|---|
| 1,495,259 A * | 5/1924 | Edholm | .................. | F16C 43/06 |
| | | | | 384/457 |
| 1,862,641 A * | 6/1932 | Turner | .................... | F16C 19/36 |
| | | | | 384/564 |
| 3,129,904 A * | 4/1964 | Hanson | ................. | F16C 27/066 |
| | | | | 244/17.19 |
| 3,707,753 A | 1/1973 | Bailey | | |
| 4,232,563 A | 11/1980 | Peterson et al. | | |
| 5,002,406 A * | 3/1991 | Morton | ................ | F16C 23/086 |
| | | | | 384/477 |
| 5,902,022 A * | 5/1999 | Shattuck | ................. | F16C 19/26 |
| | | | | 384/569 |
| 5,902,050 A | 5/1999 | Balczun et al. | | |
| 6,168,530 B1 | 1/2001 | Guimbal et al. | | |
| 6,354,745 B1 * | 3/2002 | Ai | ........................... | F16C 19/26 |
| | | | | 384/565 |
| 6,550,974 B2 | 4/2003 | Zoppitelli et al. | | |
| 7,427,163 B2 * | 9/2008 | Schoder | ................. | F16C 19/49 |
| | | | | 384/494 |
| 7,771,126 B2 * | 8/2010 | Faass | ...................... | B64C 27/14 |
| | | | | 248/580 |
| 9,746,026 B2 * | 8/2017 | Niarfeix | ................. | F16C 19/18 |
| 9,822,813 B2 * | 11/2017 | Niarfeix | ................. | F16C 19/18 |
| 9,845,825 B2 * | 12/2017 | Shattuck | ................. | F16C 23/08 |
| 9,856,911 B2 * | 1/2018 | Yoo | ......................... | F16C 27/066 |
| 2007/0053624 A1 * | 3/2007 | Schoder | ................. | F16C 19/49 |
| | | | | 384/494 |
| 2009/0067767 A1 * | 3/2009 | Faass | ...................... | B64C 27/14 |
| | | | | 384/440 |
| 2015/0210511 A1 * | 7/2015 | Zapf | ...................... | B66B 15/04 |
| | | | | 187/266 |
| 2016/0245335 A1 * | 8/2016 | Shattuck | ................. | F16C 23/08 |
| 2016/0319862 A1 * | 11/2016 | Niarfeix | ................. | F16C 19/18 |
| 2016/0319863 A1 * | 11/2016 | Niarfeix | ................. | F16C 19/18 |

* cited by examiner

DRIVE SHAFT SYSTEM HANGER BEARING

This application is a National Phase Application of Patent Application PCT/US15/21990 filed on Mar. 23, 2015, which claims the benefit of and priority to U.S. Provisional Patent Application Ser. No. 62/001,234 filed on May 21, 2014, the contents of which are incorporated herein by reference in their entirety.

FEDERAL RESEARCH STATEMENT

This invention was made with Government support under Contract No. N00019-06-C-0081 with the Department of the Navy. The Government has certain rights in the invention.

BACKGROUND

The subject matter disclosed herein relates to the art of rotary wing aircraft and, more specifically, to drive systems for rotary wing aircraft.

In typical rotary winged aircraft, for example, helicopters, one or more engines are utilized to drive a main rotor assembly, and a tail rotor located at an extending tail of the helicopter. A tail rotor shaft assembly is utilized to connect the tail rotor to the main transmission, thereby connecting it to the engine, and typically includes multiple shaft sections connected by flexible couplings and supported by bearings mounted in housings and attached to the airframe, known as hanger bearings. The flexible couplings transmit torque from one shaft segment to the next shaft segment, while the hanger bearings support the shaft segments and provide axial and angular compliance.

During operation of the helicopter, the airframe along the extending tail will deflect, thus requiring deflection of the shaft assembly, along the same curvature of the airframe deflection. Commonly, hanger bearings utilize soft rubber supports or an additional spherical element to achieve the required compliance, but these additional parts require periodic inspection and regular maintenance. The hanger bearings must operate under conditions of rotational misalignment and axial tension between adjacent segments to accommodate assembly variations and airframe deflections. These displacements and their resultant loads quickly damage the typical hanger bearing, increasing maintenance and repair required. Traditional designs utilize ball bearings mounted in rubber bushings that allow for limited deflections, reducing but not eliminating the generated loads.

BRIEF DESCRIPTION

In one embodiment, a hanger bearing assembly for a shaft assembly includes a plurality of bearing elements arranged around a circumference of a shaft assembly, each bearing element having a bearing element diameter. A bearing inner race is positioned between the plurality of bearing elements and the shaft assembly and extends circumferentially about the shaft assembly. The bearing inner race includes an outer wall interactive with the plurality of bearing elements. The outer wall has a linear profile extending in an axial direction. A bearing outer race is positioned radially outboard of the plurality of bearing elements and extends circumferentially about the shaft assembly. The bearing outer race includes an inner surface interactive with the plurality of bearing elements and having a curvilinear inner surface profile extending in the axial direction.

Additionally or alternatively, in this or other embodiments the outer wall extends circumferentially about the shaft assembly at a radial distance from a shaft axis. The inner surface profile has a radius equal to the radial distance of the outer wall from the shaft axis, plus the bearing element diameter. Additionally or alternatively, in this or other embodiments the plurality of bearing elements are a plurality of bearing balls.

Additionally or alternatively, in this or other embodiments, the hanger bearing assembly includes a bearing housing at which the bearing outer race and/or the plurality of bearing elements are disposed.

Additionally or alternatively, in this or other embodiments one or more bearing seals extend between the bearing inner race and the bearing housing.

In another embodiment, a rotary winged aircraft includes an airframe, an engine located at the airframe and a rotor shaft operably connected to the engine, extending along the airframe and operably connected to a rotor to drive rotation of the rotor. A hanger bearing assembly is secured to the airframe and is operably connected to the rotor shaft to support the rotor shaft. The hanger bearing assembly includes a plurality of bearing elements arranged around a circumference of the shaft assembly, each bearing element having a bearing element diameter. A bearing inner race is positioned between the plurality of bearing elements and the shaft assembly and extends circumferentially about the shaft assembly. The bearing inner race includes an outer wall interactive with the plurality of bearing elements. The outer wall has a linear profile extending in an axial direction. A bearing outer race is positioned radially outboard of the plurality of bearing elements and extends circumferentially about the shaft assembly. The bearing outer race includes an inner surface interactive with the plurality of bearing elements and having a curvilinear inner surface profile extending in the axial direction.

Additionally or alternatively, in this or other embodiments the outer wall extends circumferentially about the shaft assembly at a radial distance from a shaft axis. The inner surface profile has a radius equal to the radial distance of the outer wall from the shaft axis, plus the bearing element diameter. Additionally or alternatively, in this or other embodiments the plurality of bearing elements are a plurality of bearing balls.

Additionally or alternatively, in this or other embodiments, the hanger bearing assembly further includes a bearing housing at which the bearing outer race and/or the plurality of bearing elements are disposed.

Additionally or alternatively, in this or other embodiments the bearing housing is secured to the airframe.

Additionally or alternatively, in this or other embodiments one or more bearing seals extend between the bearing inner race and the bearing housing.

Additionally or alternatively, in this or other embodiments the shaft assembly includes a first shaft segment joined to a second shaft segment at a first coupling.

Additionally or alternatively, in this or other embodiments the hanger bearing assembly is located at the first coupling.

Additionally or alternatively, in this or other embodiments a third shaft segment is joined to the second shaft segment and an additional hanger bearing assembly is positioned at the second coupling.

Additionally or alternatively, in this or other embodiments the rotor shaft is a tail rotor shaft extending along an extending tail of the aircraft.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
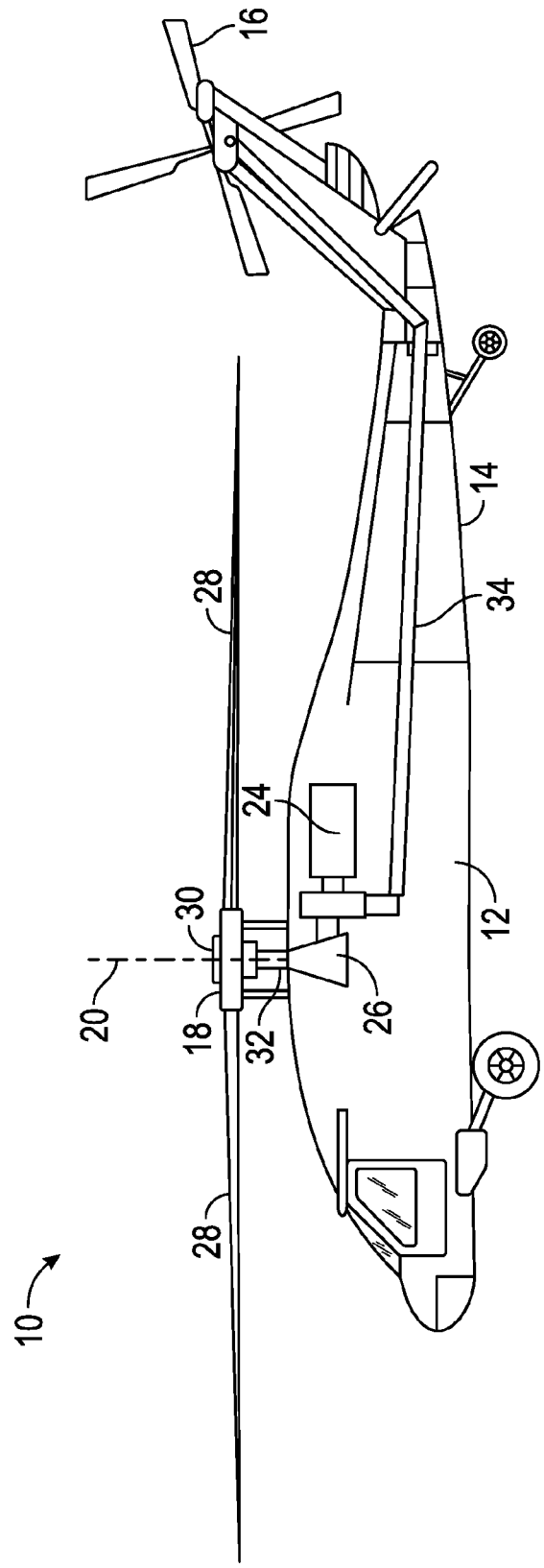
FIG. 1 is a schematic view of an embodiment of a rotary wing aircraft.

Shown in FIG. 1 is schematic view of an embodiment of a rotary wing aircraft, in this embodiment a helicopter 10. The helicopter 10 includes an airframe 12 with an extending tail 14. A main rotor assembly 18 is located at the airframe 12 and rotates about a main rotor axis 20. The main rotor assembly 18 is driven by a power source, for example, an engine 24 via a gearbox 26 about the main rotor axis 20. The rotor assembly 18 includes a plurality of rotor blades 28 secured to a rotor hub 30, with a main rotor shaft 32 connected to the rotor hub 30 and to the gearbox 26 to transfer rotational energy from the gearbox 26 to the main rotor assembly 18. The helicopter 10 further includes a tail rotor 16 located at the extending tail 14 to provide yaw control for the helicopter 10. The tail rotor 16 is connected to and driven by the engine 24 via the gearbox 26 by a tail rotor shaft 34. While shown in the context of a conventional single rotor helicopter, it is understood that that aspects of the invention are usable in other types of aircraft, including a compound counter rotating helicopter where the tail rotor 16 provides thrust.

Figure 2:
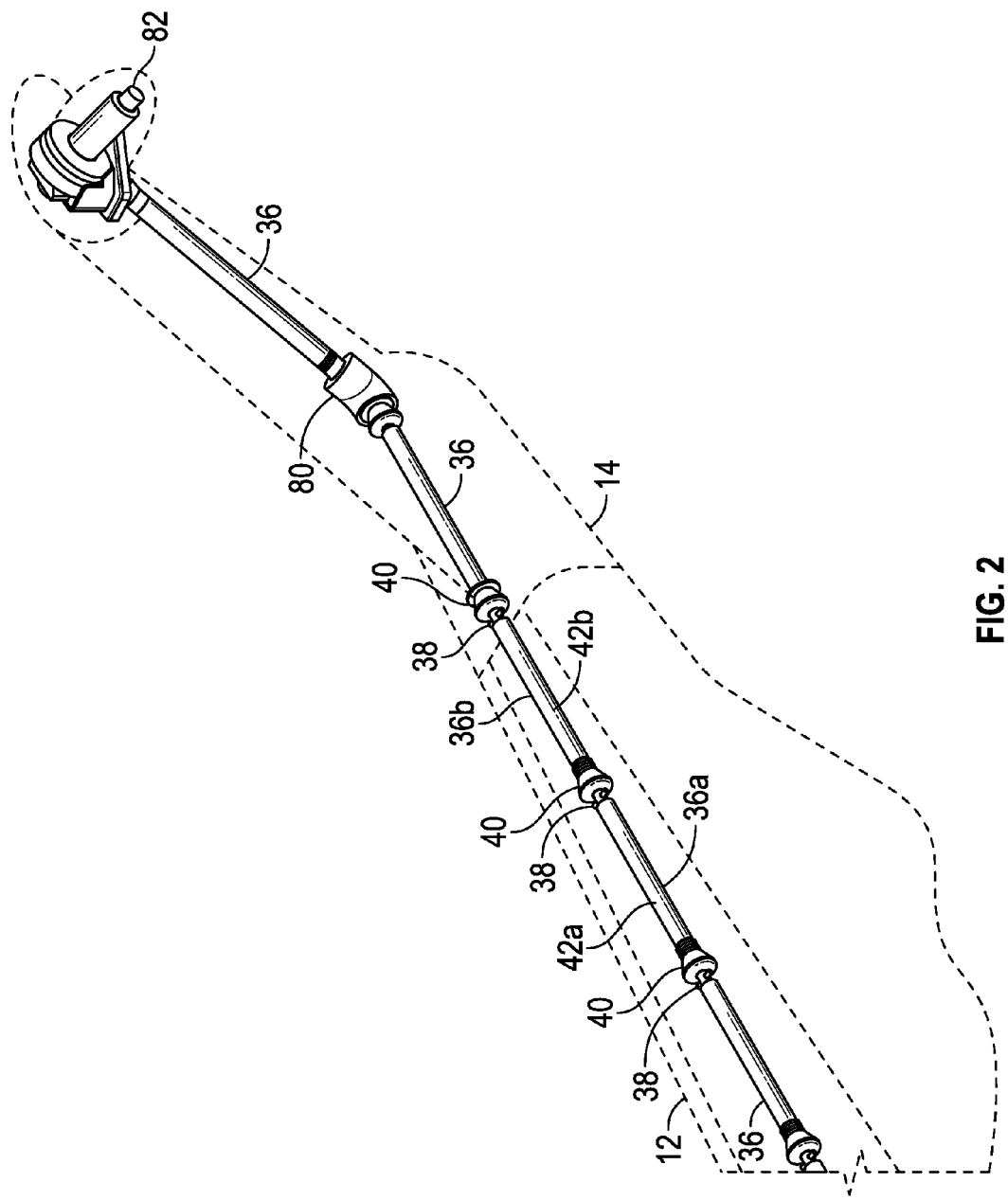
FIG. 2 is a cross-sectional of an embodiment of a tail rotor shaft assembly.

Referring now to FIG. 2, due to its length and other factors, the tail rotor shaft 34 is segmented into a plurality of tail rotor shaft segments 36, which are coupled end to end via a coupling 38 to form the tail rotor shaft 34. In some embodiments, the coupling 38 is a spline connection. Further, in some embodiments, such as shown, the tail rotor shaft 34 includes four shaft segments 36, and three couplings 38. It is to be appreciated, however, that tail rotor shafts 34 having other numbers of shaft segments 36, for example, three or five shaft segments 36, are contemplated within the scope of the present disclosure. The tail rotor shaft 34 is supported at each coupling 38 by a hanger bearing assembly 40 fixed to the airframe 12. The coupling 38 is configured to be flexible, allowing some relative displacement between shaft segments 36, while still transmitted torque between the shaft segments 36. The flexibility is such to allow a first axis 42a of a first shaft segment 36a to be nonparallel to a second axis 42b of a second shaft segment 36b. The hanger bearing assembly 40 supports the coupling 38 radially, while allowing for a degree of flexibility of, and axial shift of the coupling 38. The tail rotor shaft 34 assembly may further include an intermediate gearbox 80 and/or a tail gearbox 82 to transfer the tail rotor shaft 34 rotation to the tail rotor 16 (shown in FIG. 1).

Figure 3:
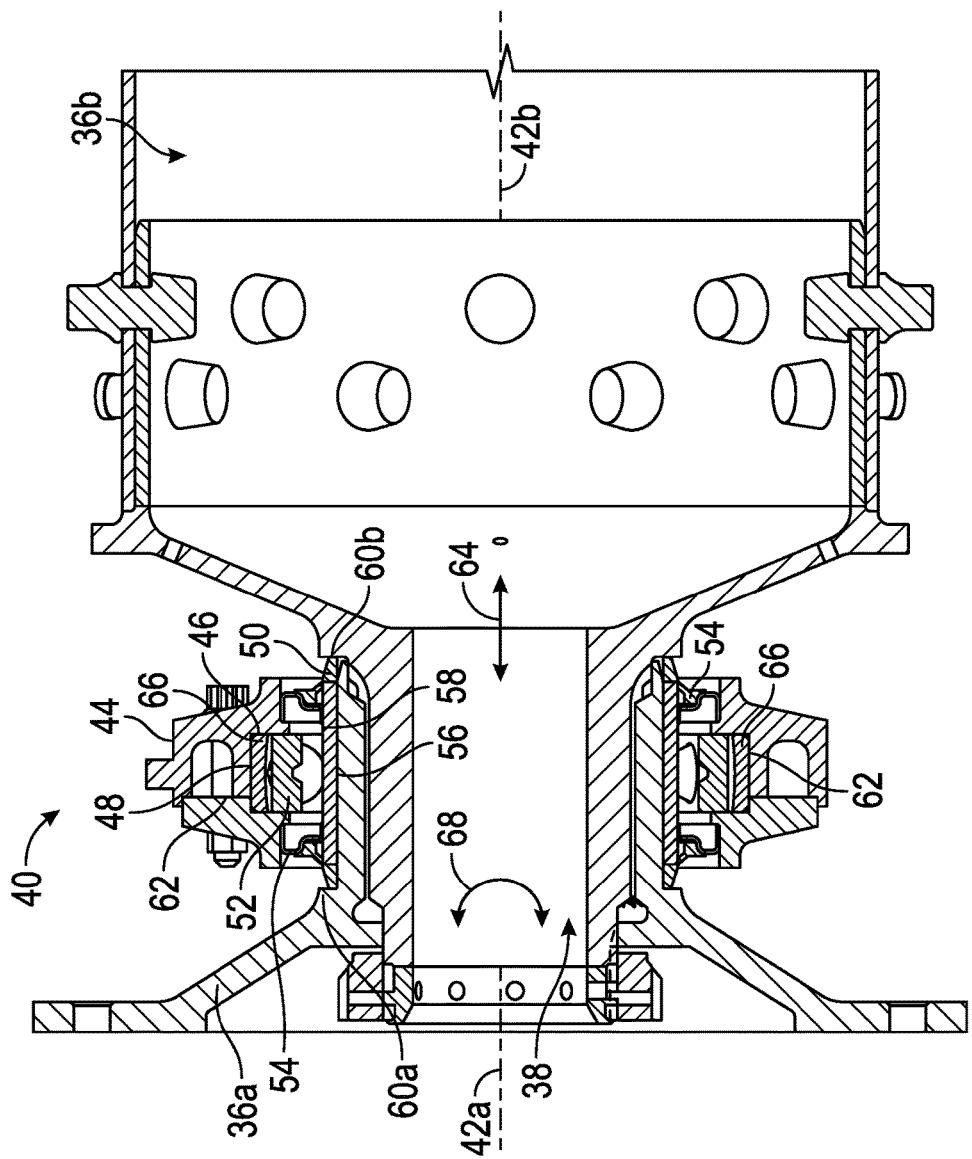
FIG. 3 is another cross-sectional view of an embodiment of a tail rotor shaft assembly.
Figure 4:
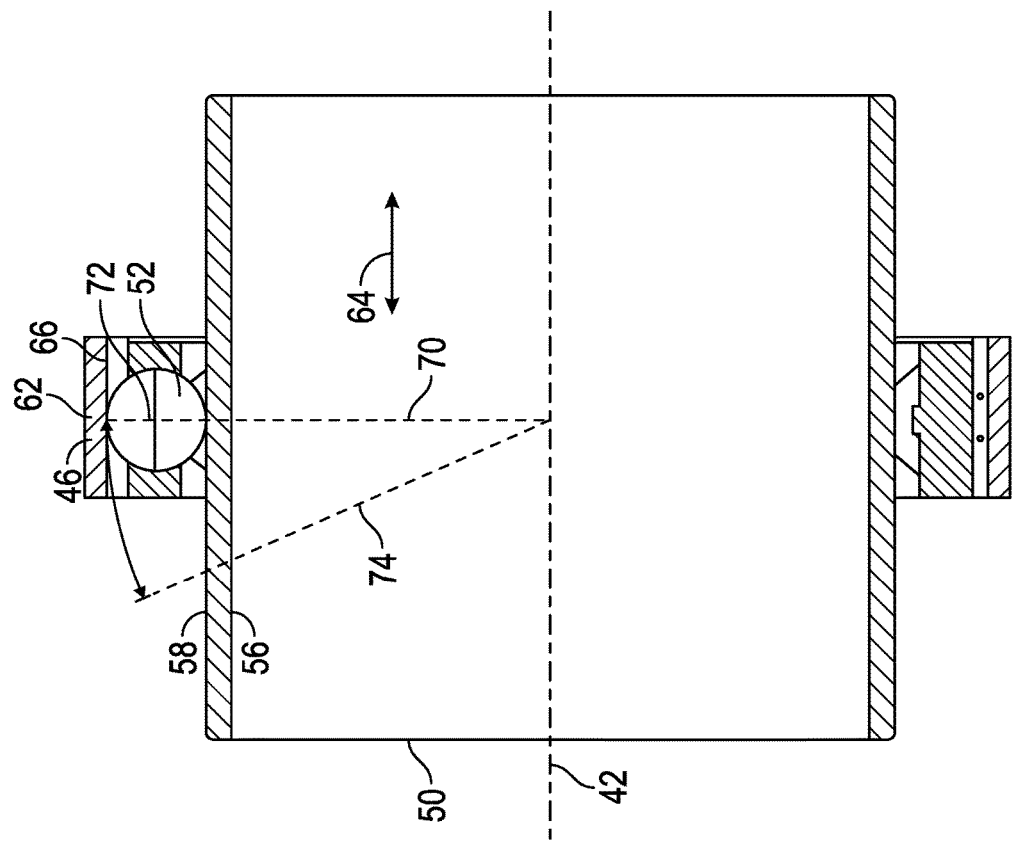
FIG. 4 is a cross-sectional view of an embodiment of a bearing.

Referring now to FIGS. 3 and 4, the hanger bearing assembly 40 will now be described in more detail. The hanger bearing assembly 40 includes a bearing housing 44 secured to the airframe 12, and to which other bearing assembly 40 components are installed. The bearing housing 44 extends circumferentially around the coupling 38 and houses a bearing outer race 46 located in a housing pocket 48. The bearing outer race 46 also extends circumferentially around the coupling 38. A bearing inner race 50 is located inboard of the bearing outer race and abuts the coupling 38 contacting, for example, shaft segment 36A. The bearing inner race extends circumferentially about the coupling 38. A plurality of bearing elements 52, for example, bearing balls, are disposed radially between the bearing inner race 50 and the outer race 46, extending circumferentially about the coupling 38. In some embodiments, the hanger bearing assembly 40 includes one or more seals 54 extending between the bearing inner race 50 and the bearing housing 44 to contain a volume of bearing lubricant, such as an oil or grease at the hanger bearing assembly 40.

The bearing inner race 50 is cylindrical, with an inner wall 56 located at the coupling 38 and an outer wall 58 radially offset form the inner wall 56, with both the inner wall 56 and the outer wall 58 having linear profiles along an axial direction 64, but which has a radius when viewed from an axial end. The outer wall 58 is interactive with the bearing elements 52. In some embodiments the inner bearing race 50 is retained at the coupling 38 axially between a first retention feature 60a at the first shaft segment 36a and a second retention feature 60b at the second shaft segment 36b. The retention features 60a, 60b may be, for example, tabs, flanges or the like.

Referring now to FIG. 4, the bearing outer race 46 includes an outer surface 62 disposed at the bearing housing 44 and an inner surface 66 interactive with the bearing elements 52. In some embodiments the outer surface 62 has a linear profile along the axial direction 64. The inner surface 66, however, has a curvilinear profile along the axial direction 64, which in some embodiments is a single, constant radius. Further, the inner surface 66 may have a profile in the axial direction with an outer race radius 74 equal to an outer wall radius 70, defined as a distance of the outer wall 58 from the shaft axis 42, plus a bearing element diameter 72.

Constructing the hanger bearing assembly 40 in this manner offers many advantages over the prior art hanger bearing. First, the linear outer wall 58 of the bearing inner race 50 allows for axial sliding of the bearing inner race 50 relative to the bearing elements 52 and the bearing housing 44 without generating axial loads on the hanger bearing assembly 40. This accommodates axial shift or misalignment of the coupling 38 relative to the bearing housing 44, which is fixed to the airframe 12. The radial profile of the inner surface 66 of the bearing outer race 46 allows for off-axial direction 64 twist of the shaft segments 36a, 36b at the coupling 38 as shown by arrow 68, accommodating applied moment displacements without internally loading the hanger bearing assembly 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, aspects can be used with propeller assemblies, wind turbines, turbines, fans or anywhere there is bearing supporting a segmented shaft.

Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A hanger bearing assembly for a shaft assembly comprising:
   a plurality of bearing elements arranged around a circumference of the shaft assembly, each bearing element having a bearing element diameter, wherein the plurality of bearing elements include bearing balls;
   a bearing inner race disposed between the plurality of bearing elements and the shaft assembly and extending circumferentially about the shaft assembly, the bearing inner race including an outer wall interactive with the plurality of bearing elements, the outer wall having a linear profile extending in an axial direction; and
   a bearing outer race disposed radially outboard of the plurality of bearing elements and extending circumferentially about the shaft assembly, the bearing outer race including an outer surface having a linear outer surface profile and an inner surface interactive with the plurality of bearing elements and having a curvilinear inner surface profile extending in the axial direction, wherein the curvilinear inner surface profile has an outer race radius equal to an outer wall radius.

2. The hanger bearing assembly of claim 1, wherein:
   the outer wall extends circumferentially about the shaft assembly at a radial distance from a shaft axis; and
   the outer wall radius includes the radial distance of the outer wall from the shaft axis, plus the bearing element diameter.

3. The hanger bearing assembly of claim 1, further comprising a bearing housing at which the bearing outer race and/or the plurality of bearing elements are disposed.

4. The hanger bearing assembly of claim 3, further comprising one or more bearing seals extending between the bearing inner race and the bearing housing.

5. A rotary winged aircraft comprising:
   an airframe;
   an engine disposed at the airframe;
   a rotor shaft operably connected to the engine, extending along the airframe and operably connected to a rotor to drive rotation of the rotor; and
   a hanger bearing assembly secured to the airframe and operably connected to the rotor shaft to support the rotor shaft, the hanger bearing assembly including:
      a plurality of bearing elements arranged around a circumference of the rotor shaft, each bearing element having a bearing element diameter, wherein the plurality of bearing elements include bearing balls;
      a bearing inner race disposed between the plurality of bearing elements and the shaft assembly and extending circumferentially about the shaft assembly, the bearing inner race including an outer wall interactive with the plurality of bearing elements, the outer wall having a linear profile extending in an axial direction; and
      a bearing outer race disposed radially outboard of the plurality of bearing elements and extending circumferentially about the shaft assembly, the bearing outer race including an outer surface having a linear outer surface profile and an inner surface interactive with the plurality of bearing elements and having a curvilinear inner surface profile extending in the axial direction, wherein the curvilinear inner surface profile has an outer race radius equal to an outer wall radius.

6. The aircraft of claim 5, wherein:
   the outer wall extends circumferentially about the shaft assembly at a radial distance from a shaft axis; and
   the outer wall radius includes a radius equal to the radial distance of the outer wall from the shaft axis, plus the bearing element diameter.

7. The aircraft of claim 5, wherein the rotor shaft is a tail rotor shaft extending along an extending tail of the aircraft.

8. The aircraft of claim 5, further comprising a bearing housing at which the bearing outer race and/or the plurality of bearing elements are disposed.

9. The aircraft of claim 8, wherein the bearing housing is secured to the airframe.

10. The aircraft of claim 8, further comprising one or more bearing seals extending between the bearing inner race and the bearing housing.

11. The aircraft of claim 5, wherein the shaft assembly includes a first shaft segment joined to a second shaft segment at a first coupling.

12. The aircraft of claim 11, wherein the hanger bearing assembly is disposed at the first coupling.

13. The aircraft of claim 11, further comprising:
   a third shaft segment joined to the second shaft segment; and
   an additional hanger bearing assembly disposed at the second coupling.

* * * * *